(12) United States Patent
Kim et al.

(10) Patent No.: US 10,739,513 B2
(45) Date of Patent: Aug. 11, 2020

(54) APPARATUSES AND METHODS FOR EFFICIENTLY DIRECTING LIGHT TOWARD AND AWAY FROM A MOUNTING SURFACE

(71) Applicant: RAB Lighting Inc., Northvale, NJ (US)

(72) Inventors: Brian Kim, Palisades Park, NJ (US); Nicholas Calaceto, Northvale, NJ (US); Wengang Gao, Ningbo (CN); Stanley Mayer, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 16/118,954

(22) Filed: Aug. 31, 2018

(65) Prior Publication Data

US 2020/0073046 A1    Mar. 5, 2020

(51) Int. Cl.
    *F21V 8/00*    (2006.01)
(52) U.S. Cl.
    CPC ......... *G02B 6/0063* (2013.01); *G02B 6/0038* (2013.01); *G02B 6/0055* (2013.01); *G02B 6/0065* (2013.01); *G02B 6/0091* (2013.01)
(58) Field of Classification Search
    CPC .. G02B 6/0063; G02B 6/0055; G02B 6/0091; G02B 6/0038; G02B 6/0065; F21K 9/61; F21V 2200/20; F21V 7/0016; F21S 8/04
    See application file for complete search history.

(56) References Cited

U.S. PATENT DOCUMENTS

| 2,831,453 | A | 4/1958 | Hardesty |
| 3,070,913 | A | 1/1963 | Miller |
| 3,213,751 | A | 10/1965 | Etal |
| 3,328,570 | A | 6/1967 | Balchunas |
| 3,692,383 | A | 9/1972 | Herod et al. |

(Continued)

FOREIGN PATENT DOCUMENTS

| CN | 204534353 | 8/2015 |
| DE | 102004046256 | 4/2006 |

(Continued)

OTHER PUBLICATIONS

Philips Gardco; Garage & Canopy SoftView product pages, 2018. http://www.e-litecom.com/webapp/eng/research/blu.jsp.

*Primary Examiner* — Peggy A Neils
(74) *Attorney, Agent, or Firm* — Frost Brown Todd LLC; Dennis S. Schell; Kevin C. Oschman

(57) ABSTRACT

Luminaires that simultaneously illuminate a support surface (for example, a floor) and the surface to which the luminaires are mounted (for example, a ceiling) and methods for manufacturing the same are disclosed. Embodiments include luminaires that divide the light from a single light emitter (which may include one or more light sources such as LEDs) into a portion directed toward the luminaire's mounting surface and a portion directed toward the support surface. Some embodiments utilize a planar light guide with the light emitter mounted adjacent one edge, which in some embodiments is the internal edge of an aperture formed in the planar light guide. In some embodiments, one surface of the light guide includes grooves that internally reflect light toward the support surface while allowing a smaller amount of light to exit the light guide toward the mounting surface, and may be grouped according to the distance separating adjacent grooves.

22 Claims, 13 Drawing Sheets

(56) References Cited

U.S. PATENT DOCUMENTS

| | | |
|---|---|---|
| 4,043,636 A | 8/1977 | Eberhardt et al. |
| 4,183,628 A | 1/1980 | Lesser et al. |
| 4,257,084 A | 3/1981 | Reynolds |
| 4,260,220 A | 4/1981 | Whitehead |
| 4,277,817 A | 7/1981 | Hehr |
| 4,373,282 A | 2/1983 | Wragg |
| 4,576,850 A | 3/1986 | Martens |
| 4,714,983 A | 12/1987 | Lang |
| 4,767,172 A | 8/1988 | Nichols et al. |
| 4,890,201 A | 12/1989 | Toft |
| 4,909,604 A | 3/1990 | Kobayashi et al. |
| 4,914,553 A | 4/1990 | Hamada et al. |
| 4,978,952 A | 12/1990 | Irwin |
| 4,984,114 A | 1/1991 | Takeuchi et al. |
| 5,005,108 A | 4/1991 | Pristash et al. |
| 5,040,098 A | 8/1991 | Tanaka et al. |
| 5,050,946 A | 9/1991 | Hathaway et al. |
| 5,070,431 A | 12/1991 | Kitazawa et al. |
| 5,076,591 A | 12/1991 | Gentile |
| 5,093,176 A | 3/1992 | Pribonic et al. |
| 5,128,842 A | 7/1992 | Kenmochi |
| 5,309,544 A | 5/1994 | Saxe |
| 5,339,179 A | 8/1994 | Rudisill et al. |
| 5,359,691 A | 10/1994 | Tai et al. |
| 5,390,436 A | 2/1995 | Ashall |
| 5,404,277 A | 4/1995 | Lindblad |
| 5,428,468 A | 6/1995 | Zimmerman et al. |
| 5,461,507 A | 10/1995 | Westland et al. |
| 5,475,043 A | 12/1995 | Shiga et al. |
| 5,555,160 A | 9/1996 | Tawara et al. |
| 5,572,411 A | 11/1996 | Watai et al. |
| 5,584,556 A | 12/1996 | Yokoyama et al. |
| 5,598,281 A | 1/1997 | Zimmerman et al. |
| 5,659,410 A | 8/1997 | Koike et al. |
| 5,664,862 A | 9/1997 | Redmond et al. |
| 5,677,702 A | 10/1997 | Inoue et al. |
| 5,719,649 A | 2/1998 | Shono et al. |
| 5,735,590 A | 4/1998 | Kashima et al. |
| 5,761,355 A | 6/1998 | Kuper et al. |
| 5,897,201 A * | 4/1999 | Simon ............... F21V 5/00 362/147 |
| 5,961,198 A | 10/1999 | Hira et al. |
| 5,980,054 A | 11/1999 | Fukui et al. |
| 6,097,549 A | 8/2000 | Jenkins et al. |
| 6,129,439 A | 10/2000 | Hou et al. |
| 6,130,730 A | 10/2000 | Jannson et al. |
| 6,134,092 A | 10/2000 | Pelka et al. |
| 6,161,939 A | 12/2000 | Bansbach |
| 6,164,790 A | 12/2000 | Lee |
| 6,164,791 A | 12/2000 | Gwo-Juh et al. |
| 6,167,182 A | 12/2000 | Shinohara et al. |
| 6,193,383 B1 | 2/2001 | Onikiri et al. |
| 6,257,737 B1 | 7/2001 | Marshall et al. |
| 6,259,854 B1 | 7/2001 | Shinji et al. |
| 6,285,425 B1 | 9/2001 | Akins et al. |
| 6,367,941 B2 | 4/2002 | Lea et al. |
| 6,379,016 B1 | 4/2002 | Boyd et al. |
| 6,379,017 B2 | 4/2002 | Nakabayashi et al. |
| 6,400,086 B1 | 6/2002 | Huter |
| 6,456,437 B1 | 9/2002 | Lea et al. |
| 6,536,921 B1 | 3/2003 | Simon |
| 6,582,103 B1 | 6/2003 | Popovich et al. |
| 6,601,984 B2 | 8/2003 | Yamamota et al. |
| 6,612,723 B2 | 9/2003 | Futhey et al. |
| 6,616,305 B1 * | 9/2003 | Simon ............... F21V 5/02 362/268 |
| 6,647,199 B1 | 11/2003 | Pelka et al. |
| 6,712,481 B2 | 3/2004 | Parker et al. |
| 6,724,543 B1 | 4/2004 | Chinniah et al. |
| 6,745,506 B2 | 6/2004 | Maas et al. |
| 6,752,505 B2 | 6/2004 | Parker et al. |
| 6,755,556 B2 | 6/2004 | Gasquet et al. |
| 6,758,582 B1 | 7/2004 | Hsiao et al. |
| 6,775,460 B2 | 8/2004 | Steiner et al. |
| 6,802,678 B2 | 10/2004 | Augis |
| 6,845,212 B2 | 1/2005 | Gardiner et al. |
| 6,854,857 B2 | 2/2005 | Hara et al. |
| 6,891,677 B2 | 5/2005 | Nilsen et al. |
| 6,924,943 B2 | 8/2005 | Minano et al. |
| 7,006,306 B2 | 2/2006 | Falicoff et al. |
| 7,025,482 B2 | 4/2006 | Yamashita et al. |
| 7,085,460 B2 | 8/2006 | Leu et al. |
| 7,131,764 B2 | 11/2006 | Hsu et al. |
| 7,175,330 B1 | 2/2007 | Chen |
| 7,182,499 B2 | 2/2007 | Chen et al. |
| 7,192,174 B2 | 3/2007 | Myoung |
| 7,204,634 B2 | 4/2007 | Chen et al. |
| 7,223,004 B2 | 5/2007 | Chen et al. |
| 7,246,931 B2 | 7/2007 | Hsieh et al. |
| 7,265,800 B2 | 9/2007 | Jagt et al. |
| 7,292,967 B2 | 11/2007 | McDonough et al. |
| 7,311,431 B2 | 12/2007 | Chew et al. |
| D563,036 S | 2/2008 | Miyairi et al. |
| 7,393,132 B2 | 7/2008 | Chen |
| 7,486,854 B2 | 2/2009 | Van Ostrand et al. |
| 7,559,672 B1 | 7/2009 | Parkyn et al. |
| 7,703,945 B2 | 4/2010 | Leung et al. |
| 7,780,306 B2 | 8/2010 | Hoshi |
| 7,857,482 B2 | 12/2010 | Reo et al. |
| 7,934,854 B2 | 5/2011 | Anglikowski et al. |
| 8,068,197 B2 | 11/2011 | Mifune et al. |
| 8,075,157 B2 | 12/2011 | Zhang et al. |
| 8,096,681 B2 | 1/2012 | Fang et al. |
| 8,113,704 B2 | 2/2012 | Bae et al. |
| 8,152,339 B2 | 4/2012 | Morgan |
| 8,152,352 B2 | 4/2012 | Richardson |
| 8,167,474 B2 | 5/2012 | Tanoue et al. |
| 8,212,263 B2 | 7/2012 | Bierhuizen et al. |
| 8,231,259 B2 | 7/2012 | Keller et al. |
| 8,292,467 B2 | 10/2012 | Vissenberg et al. |
| 8,297,818 B2 | 10/2012 | Richardson |
| 8,301,002 B2 | 10/2012 | Shani |
| 8,351,744 B2 | 1/2013 | Travis et al. |
| 8,430,548 B1 | 4/2013 | Kelly et al. |
| 8,434,892 B2 | 5/2013 | Zwak et al. |
| 8,454,218 B2 | 6/2013 | Wang et al. |
| 8,475,010 B2 | 7/2013 | Vissenberg et al. |
| 8,496,360 B2 | 7/2013 | Phillips, III et al. |
| 8,506,112 B1 | 8/2013 | Dau et al. |
| 8,534,901 B2 | 9/2013 | Panagotacos et al. |
| D693,045 S | 11/2013 | Kirschhoffer et al. |
| 8,641,219 B1 | 2/2014 | Johnson et al. |
| 8,696,173 B2 | 4/2014 | Urtiga et al. |
| 8,702,281 B2 | 4/2014 | Okada et al. |
| 8,733,982 B2 | 5/2014 | Richardson |
| 8,740,440 B2 | 6/2014 | Mizuno et al. |
| D711,584 S | 8/2014 | Parker et al. |
| 8,827,531 B2 | 9/2014 | Richardson et al. |
| 8,853,942 B1 | 10/2014 | Lewis, Jr. et al. |
| 8,864,360 B2 | 10/2014 | Parker et al. |
| 8,911,132 B1 | 12/2014 | Foy et al. |
| 9,046,225 B2 | 6/2015 | Meyers et al. |
| 9,110,209 B2 | 8/2015 | Blessitt et al. |
| 9,156,511 B2 * | 10/2015 | Rohrlich ............... B62J 6/04 |
| 9,261,639 B1 | 2/2016 | Tuohioja |
| 9,291,320 B2 | 3/2016 | Durkee |
| 9,335,464 B2 | 5/2016 | Grigore |
| 9,337,373 B2 * | 5/2016 | Morgan ............... H01L 31/18 |
| 9,366,799 B2 | 6/2016 | Wilcox et al. |
| 9,383,508 B2 | 7/2016 | Getzinger et al. |
| 9,416,925 B2 * | 8/2016 | Sarmadi ............... F21S 8/06 |
| 9,448,353 B2 | 9/2016 | Holman et al. |
| 9,495,892 B2 | 11/2016 | Gongola et al. |
| 9,581,751 B2 * | 2/2017 | Yuan ............... G02B 6/0031 |
| 9,581,756 B2 * | 2/2017 | Boomgaarden ......... F21V 23/02 |
| 9,618,678 B1 | 4/2017 | Tickner et al. |
| 10,274,173 B2 * | 4/2019 | Schubert ............. G02B 6/0081 |
| 2002/0021385 A1 | 2/2002 | Nakabayashi et al. |
| 2002/0101551 A1 | 8/2002 | Akaoka |
| 2002/0131275 A1 | 9/2002 | Yamamoto et al. |
| 2004/0125590 A1 | 7/2004 | Tsai |
| 2004/0135933 A1 | 7/2004 | Leu et al. |
| 2004/0145885 A1 | 7/2004 | Chen |
| 2004/0213003 A1 | 10/2004 | Lauderdale et al. |

(56) References Cited

U.S. PATENT DOCUMENTS

| | | |
|---|---|---|
| 2004/0223314 A1 | 11/2004 | Ching-Huang et al. |
| 2004/0264188 A1 | 12/2004 | Tazawa et al. |
| 2005/0210643 A1 | 9/2005 | Mezei et al. |
| 2006/0002146 A1 | 1/2006 | Baba |
| 2006/0147151 A1 | 7/2006 | Wanninger et al. |
| 2007/0086171 A1 | 4/2007 | Araujo |
| 2007/0189033 A1 | 8/2007 | Watanabe et al. |
| 2009/0027588 A1 | 1/2009 | Medendorp, Jr. et al. |
| 2009/0196071 A1* | 8/2009 | Matheson ............ G02B 6/0021 362/623 |
| 2010/0008088 A1 | 1/2010 | Koizumi et al. |
| 2010/0133422 A1 | 6/2010 | Lin et al. |
| 2010/0135012 A1 | 6/2010 | Lee |
| 2010/0149787 A1 | 6/2010 | Zhang et al. |
| 2010/0157577 A1 | 6/2010 | Montgomery et al. |
| 2010/0220497 A1 | 9/2010 | Ngai |
| 2010/0238671 A1 | 9/2010 | Catone et al. |
| 2011/0013420 A1 | 1/2011 | Coleman et al. |
| 2011/0233568 A1 | 9/2011 | An et al. |
| 2011/0309735 A1 | 12/2011 | Parker et al. |
| 2011/0317436 A1 | 12/2011 | Kuan |
| 2012/0008338 A1 | 1/2012 | Ono et al. |
| 2012/0049759 A1 | 3/2012 | Pezzutti et al. |
| 2012/0069579 A1 | 3/2012 | Koh et al. |
| 2012/0140461 A1 | 6/2012 | Pickard |
| 2012/0182767 A1 | 7/2012 | Petcavich et al. |
| 2012/0257383 A1 | 10/2012 | Zhang |
| 2012/0268916 A1 | 10/2012 | Yoo |
| 2012/0281432 A1 | 11/2012 | Parker et al. |
| 2012/0289671 A1 | 11/2012 | Takaai et al. |
| 2012/0300456 A1 | 11/2012 | Phillips, III et al. |
| 2012/0307496 A1 | 12/2012 | Phillips, III et al. |
| 2012/0314449 A1 | 12/2012 | McCollum et al. |
| 2012/0327652 A1 | 12/2012 | Lee |
| 2013/0003363 A1 | 1/2013 | Lu et al. |
| 2013/0044480 A1 | 2/2013 | Sato et al. |
| 2013/0107518 A1 | 5/2013 | Boyer et al. |
| 2013/0170210 A1 | 7/2013 | Athalye |
| 2013/0215612 A1 | 8/2013 | Garcia |
| 2013/0279198 A1 | 10/2013 | Lin et al. |
| 2014/0029257 A1 | 1/2014 | Boyer et al. |
| 2014/0043850 A1 | 2/2014 | Thompson et al. |
| 2014/0153253 A1 | 6/2014 | Chen |
| 2014/0185304 A1 | 7/2014 | Hsiao et al. |
| 2014/0212090 A1 | 7/2014 | Wilcox et al. |
| 2014/0218875 A1 | 8/2014 | Nakayama et al. |
| 2014/0226330 A1* | 8/2014 | Yun ............................ F21V 5/00 362/235 |
| 2014/0268869 A1 | 9/2014 | Blessitt et al. |
| 2014/0268879 A1 | 9/2014 | Mizuyama et al. |
| 2014/0270672 A1 | 9/2014 | Durkee |
| 2014/0286052 A1 | 9/2014 | McCollum et al. |
| 2014/0293189 A1 | 10/2014 | Fukunaga et al. |
| 2014/0355302 A1 | 12/2014 | Wilcox et al. |
| 2015/0049505 A1 | 2/2015 | Wang et al. |
| 2015/0049511 A1 | 2/2015 | Tarsa et al. |
| 2015/0338059 A1 | 11/2015 | Allen et al. |
| 2015/0338564 A1 | 11/2015 | Zhang et al. |
| 2016/0131331 A1 | 5/2016 | Parker et al. |
| 2016/0320553 A1 | 11/2016 | Grigore |
| 2017/0090097 A1 | 3/2017 | Zhang |
| 2017/0242182 A1 | 8/2017 | Diana et al. |
| 2017/0321865 A1* | 11/2017 | Parker .................. F21V 7/0016 |

FOREIGN PATENT DOCUMENTS

| | | |
|---|---|---|
| EP | 0594089 | 6/2001 |
| EP | 1716438 | 11/2006 |
| EP | 2045633 | 4/2009 |
| EP | 2241800 | 1/2011 |
| EP | 2708803 | 3/2014 |
| EP | 2811221 | 12/2014 |
| EP | 2883094 | 6/2015 |
| JP | 2009259708 | 11/2009 |
| JP | 2010153215 | 7/2010 |
| SE | 456359 | 9/1988 |
| WO | 2013094525 | 6/2013 |
| WO | 2016171505 | 10/2016 |

* cited by examiner

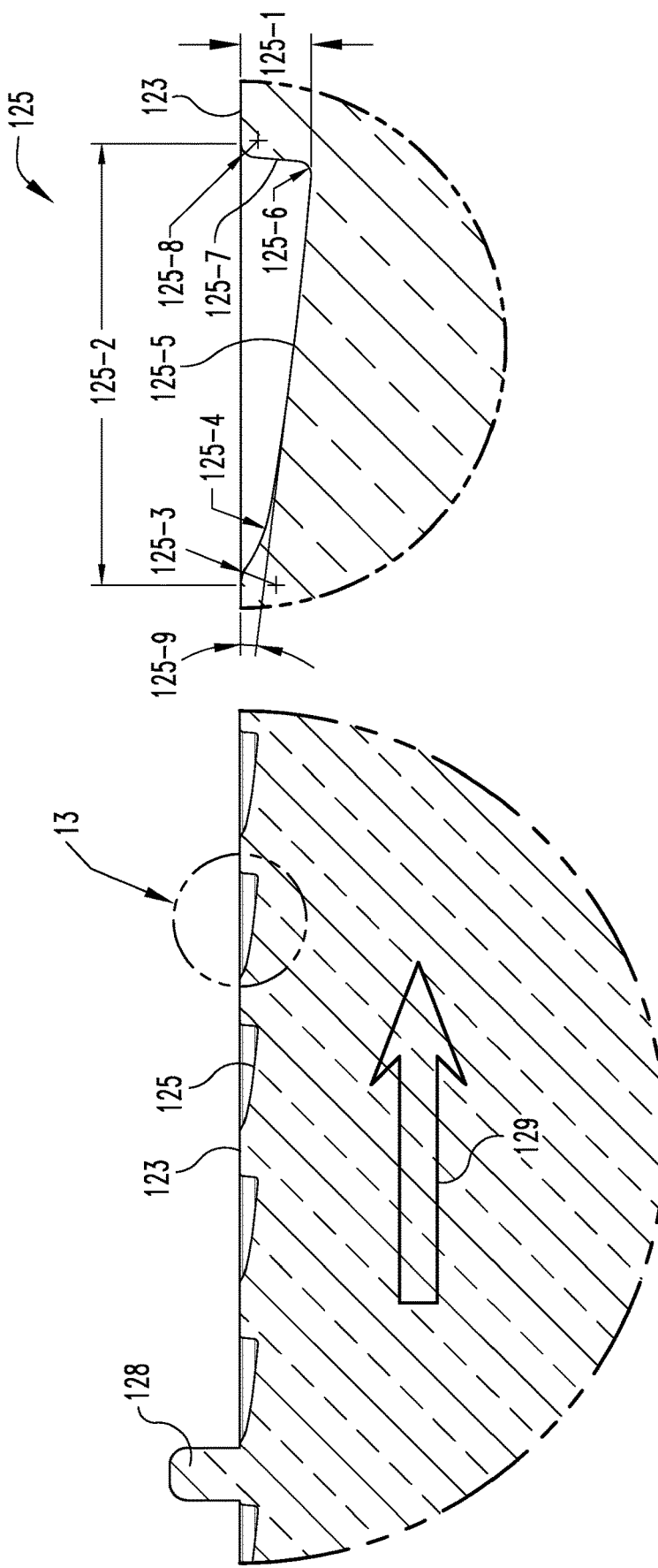

APPARATUSES AND METHODS FOR EFFICIENTLY DIRECTING LIGHT TOWARD AND AWAY FROM A MOUNTING SURFACE

FIELD

Embodiments of the present disclosure relate generally to luminaries, for example lighting fixtures, and to improved lighting fixtures that direct light toward an away form a mounting surface.

BACKGROUND

In an effort to meet demand for devices that use less energy, manufacturers of lighting devices have started manufacturing lighting devices that are more efficient than traditional devices using incandescent light bulbs. One example has been the use of light emitting diodes (LEDs) in lighting devices. However, it was realized by the inventors of the current disclosure that problems exist with how these more efficient light sources are utilized and that improvements in light fixtures to meet various needs, including the aesthetic and low power consumption needs of consumers. Certain preferred features of the present disclosure address these and other needs and provide other important advantages.

SUMMARY

It was realized by the inventors of the present disclosure that deficiencies exist in current lighting fixtures, especially those used to illuminate parking garages and similar structures. Many modern, high efficiently lighting fixtures (such as those using LED technology) do not illuminate the ceiling above the fixture. This lack of adequate illumination above the fixture leaves dark/shadowed spaces that some users find unsettling. And, while it may be possible to illuminate the ceiling above the garage with a separate light source, doing so can complicate the design leading to various difficulties, such as increased manufacturing costs, lower reliability, and higher energy requirements. Efficiencies were also discovered in utilizing a combination of light guides and reflectors to address the prior deficiencies in manufacturing costs, reliability and energy usage.

Embodiments of the present disclosure provide improved apparatuses and methods for directing light, and for directing light toward and away from a mounting surface.

Various aspects of different embodiments of the present disclosure are expressed in the following four (4) paragraphs (paragraphs [0006]-[0009]).

A luminaire mountable to a mounting surface, comprising: a light source adapted to emit light; a mounting member connected to the light source and adapted to mount to a mounting surface with an expected shape; and a light directing member connected to the mounting member and positioned to receive light from the light source, wherein the light directing member directs light received from the light source toward and away from a mounting surface with the expected shape when the mounting member is mounted to the mounting surface with the expected shape.

A luminaire, comprising: a light emitter; and a planar light guide attached to the light emitter and positioned to receive and propagate light away from the light emitter, the planar light guide including two opposing surfaces, the first opposing surface including a plurality of parallel grooves, each groove adapted to internally reflect light propagating through the light guide from the light emitter in a direction toward the second opposing surface, the second opposing surface being arranged to pass the light being reflected from the grooves on the first opposing surface through the second opposing surface and out of the planar light guide, wherein the grooves are arranged in at least two adjacent groups, the grooves in the first adjacent group being spaced from one another by a first distance, and the grooves in the second adjacent group being spaced from one another by a second distance different from the first distance.

A luminaire, comprising: a light emitter; and means for dividing the light from the light emitter, directing a portion of the light from the light emitter toward a mounting surface to which the luminaire is adapted to mount, and directing a portion of the light from the light emitter away from a mounting surface to which the luminaire is adapted to mount.

A method, comprising: selecting an expected shape for a mounting surface; connecting a light emitter to a mounting structure, the mounting structure adapted to mount to a mounting surface with the expected shape; connecting a light directing member to the mounting structure; positioning the light directing member to receive light from the light emitter and simultaneously direct light received from the light emitter toward and away from a mounting surface with the expected shape.

Yet other embodiments include the features described in any of the preceding four paragraphs (paragraphs [0006]-[0009]), as combined with (i) one or more of the preceding four paragraphs (paragraphs [0006]-[0009]), (ii) one or more of the following paragraphs in this summary section (paragraphs [0011]-[0030]), or (iii) one or more of the preceding four paragraphs (paragraphs [0006]-[0009]) and one or more of the following paragraphs (paragraphs [0011]-[0030]) in this summary section.

A light blocking member connected to the mounting member and positioned to block less than all of the light received from the light source and directed toward an expected mounting surface by the light directing member.

Wherein the light blocking member includes a reflective surface facing the light directing member.

Wherein the light directing member is a planar light guide with a central aperture and an outer edge, the light source is positioned in the central aperture, the light blocking member is positioned to block light emanating from the light guide adjacent to the aperture, and the light blocking member is positioned to permit light emanating from the light guide adjacent the outer edge to continue along its pathway.

Wherein 20 percent of the total luminance (candela per square inch) of the luminaire is directed toward an expected mounting surface.

Wherein the light directing member includes a plurality of grooves on the surface facing the ceiling, and wherein greater than half of the light from the light source and propagating through the light guide internally reflects off the plurality of grooves.

Wherein the light directing member is a planar light guide with a central aperture and an outer edge, the light blocking member is positioned to block light emanating from the light guide adjacent to the aperture, and the grooves form concentric circles.

Wherein the distance between adjacent grooves near the central aperture is greater than the spacing between adjacent grooves near the outer edge.

Wherein the distance between adjacent grooves decreases as the distance from the aperture to the midpoint between the adjacent grooves increases.

Wherein the distances between adjacent grooves are grouped together with the spacing in one group being equal and different from the spacing in the other groups.

Wherein all light directed toward an expected mounting surface is directed toward an expected mounting surface by the light directing member.

Wherein the spacing between a first pair of adjacent grooves is greater than the spacing between a second pair of adjacent grooves, the first pair of adjacent grooves being closer to the light emitter than the second pair of adjacent grooves.

Wherein the plurality of grooves are arranged in groups, the distance between adjacent grooves in a first group being equal to a first spacing distance, the distance between adjacent grooves in a second group being equal to a second spacing distance, and the first spacing difference is different from the first spacing distance.

Wherein the first group of grooves is nearer to the light emitter than the second group of grooves, and wherein the first spacing distance is greater than the second spacing distance.

Wherein the planar light guide includes an aperture and an outer edge, the light emitter being located in the aperture, and the planar light guide defines a thickness that is constant from the aperture to the outer edge.

Wherein the parallel grooves are arranged in concentric circles.

A reflector positioned adjacent the first opposing surface.

A reflector attached to the light emitter and positioned adjacent the first opposing surface; wherein the reflector reflects light escaping from the first opposing surface back toward the first opposing surface, and wherein the first opposing surface of the planar light guide includes posts contacting the reflector and spacing the reflector from the light guide.

Wherein the reflector is sized to be coextensive with at most 90% of the first opposing surface.

Wherein the means includes a light guide and the light emitter is mounted adjacent one edge of the light emitter.

Wherein the portion of the light directed from the light emitter toward a mounting surface to which the luminaire is adapted to mount equals 10 to 15 percent of the total light being directed toward and away from a mounting surface to which the luminaire is adapted to mount.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 12 is a partial, sectional view of detail 12 in FIG. 9.
FIG. 13 is a partial, sectional view of detail 13 in FIG. 12.

DETAILED DESCRIPTION OF THE ILLUSTRATED EMBODIMENTS

Figure 1:
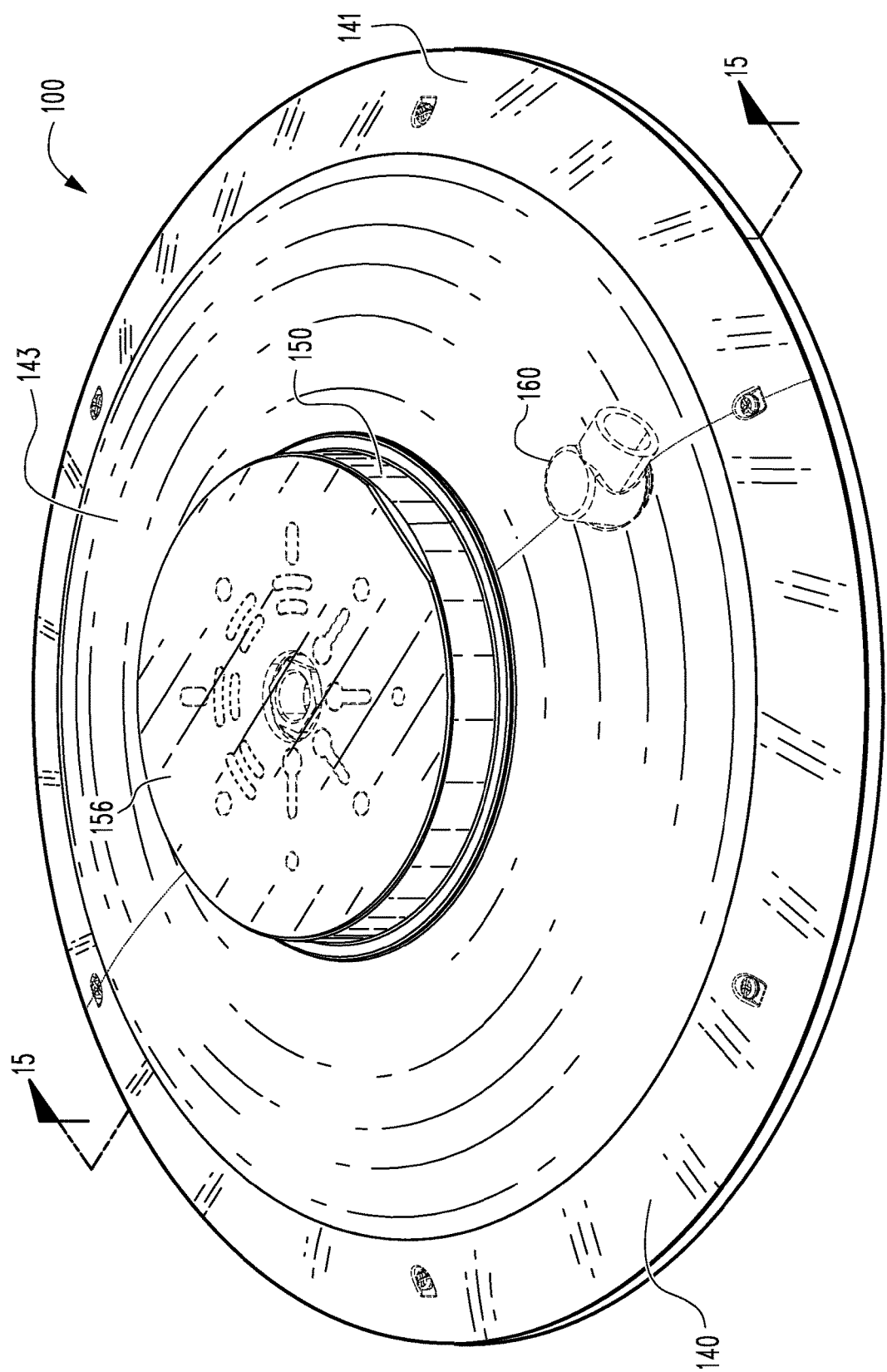
FIG. 1 is a perspective view of the upper side of a luminaire according to one embodiment of the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure provide an improved luminaire (for example, a light fixture) that directs light toward and away from a mounting surface. The luminaire may be configured for attachment to a mounting structure with a certain shape, such as a ceiling where the shape is a flat plane, and the arrangement of the components in the luminaire creates a lighting pattern suitable for that particular mounting structure. At least one embodiment of the present disclosure is configured to mount to a ceiling and direct light from a light emitting member (which may include one or more light sources, for example, one or more light emitting diodes (LEDs)) downward to illuminate the support surface (for example, the floor) below the luminaire and simultaneously direct light from the light emitter upward toward the ceiling. A light directing member, such as a light guide, can receive the light from the light emitter and direct a portion of the light toward the mounting surface of the mounting structure and a portion of the light away from the mounting surface. An example use of this embodiment is to place the luminaire in an enclosed structure, such as a parking garage, where the downward light illuminates the floor of the garage, while some of the light is directed upward and illuminates the garage ceiling. While illuminating the floor allows users of the structure/garage to see obstacles, illuminating the ceiling with enough intensity for a person on the floor to be able to determine the location of the ceiling increases the comfort level of the people using the garage by illuminating what would otherwise be dark/shadowed areas, assists in decreasing claustrophobia by making the structure appear more spacious and making it easier for users to determine the overall size of the garage, and enhances the aesthetic appearance of the luminaire.

In a least one embodiment, the light director is a generally planer light guide that receives the light generated by the one or more light emitters and directs the light both toward and away from the mounting surface. One example embodiment is a ceiling mounted luminaire suitable for mounting in a garage where the lighting is directed downward and upward. In some embodiments, the amount of light directed in the downward direction is significantly greater than the light directed in the upward direction in order to direct a majority of the light toward the support surface upon which people and/or automobiles will be supported.

In some embodiments, the imperfections in manufacturing the light guide can result in more light being directed in the upward direction than desired. In these embodiments, a member that block the light (for example, a reflector) that covers a portion of the upper surface of the light guide, but not the entirety of the upper surface of the light guide, is used to direct (for example, reflect) light emanating upward from the light guide back downward into the light guide and away from the mounting surface, while allowing some of the light emanating from the upper surface of the light guide to continue onto the mounting surface instead.

Depicted in FIGS. 1-6 is a luminaire 100 according to one embodiment of the present disclosure. Luminaire 100 includes a light emitter 110 (see FIG. 6), a light directing member 120 (for example, a light guide, see FIG. 2), and a mounting member for mounting the luminaire on the mounting surface. Luminaire optionally includes a light blocking member 146 (for example, a reflector, see FIG. 6), a housing 130 (see FIG. 6), a cover 140 (see FIG. 1), a mounting box 150 (see FIG. 1), an optional accessory adapter 160 (see FIG. 1), and in embodiments including light emitting diodes (LEDs) one or more drivers 170 (see FIG. 6). While in some embodiments the light directing member directs the appropriate portions of light toward and away from the mounting surface, other embodiments utilize a light blocking member, which may have advantages in manufacturing simplicity and manufacturing costs. When used, the light blocking member blocks a sufficient amount of light, and redirects it downward in at least the embodiments where the light blocking member is a reflector, so that a person viewing the luminaire will perceive a difference between the amount of light striking the mounting surface with and without the light blocking member.

Figure 6:
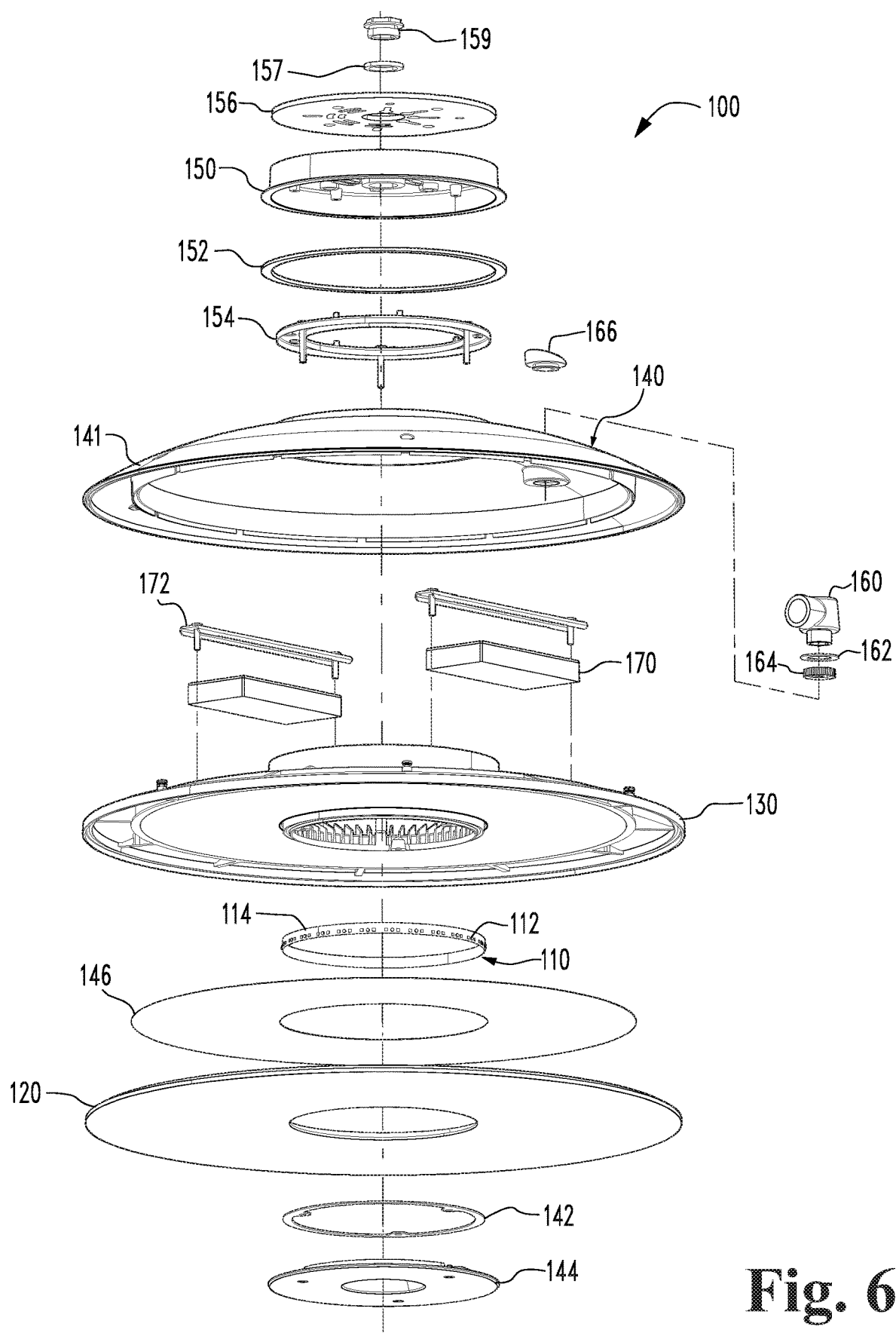
FIG. 6 is an exploded view of the embodiment shown in FIG. 1.

Light emitter 110 includes one or more light sources 112 (for example, Light Emitting Diodes—LEDs) and, in some embodiments (for example, embodiments utilizing LEDs), a base structure 114 to which the light sources 112 are mounted. The light source may be arranged around the inner perimeter of light guide 120, as shown in FIG. 6, or around the outer perimeter of light guide 120, and positioned so that light emanating from the light sources 112 enters the edge of the light guide 120. Advantages are realized by positioning the light sources 112 close to the surface of light guide 120 so that light guide 120 captures a substantial amount of the light being emitted from the light sources 112.

In some embodiments, the shape of light emitter 110 is similar to the shape of the light guide surface adjacent light emitter 110. For example, in the embodiments depicted in FIGS. 1-6, the inner surface of light guide 120 is circular and light emitter 110 is similarly circular. However, in other embodiments the shape of light emitter 110 and the adjacent surface in light guide 120 may be different, such as when manufacturing efficiencies may dictate shapes that are different. Other embodiments include light emitter 110 shapes that are triangular, square, rectangular, hexagonal, or other shapes that may be desirable form either an aesthetic or manufacturing perspective.

Figure 7:
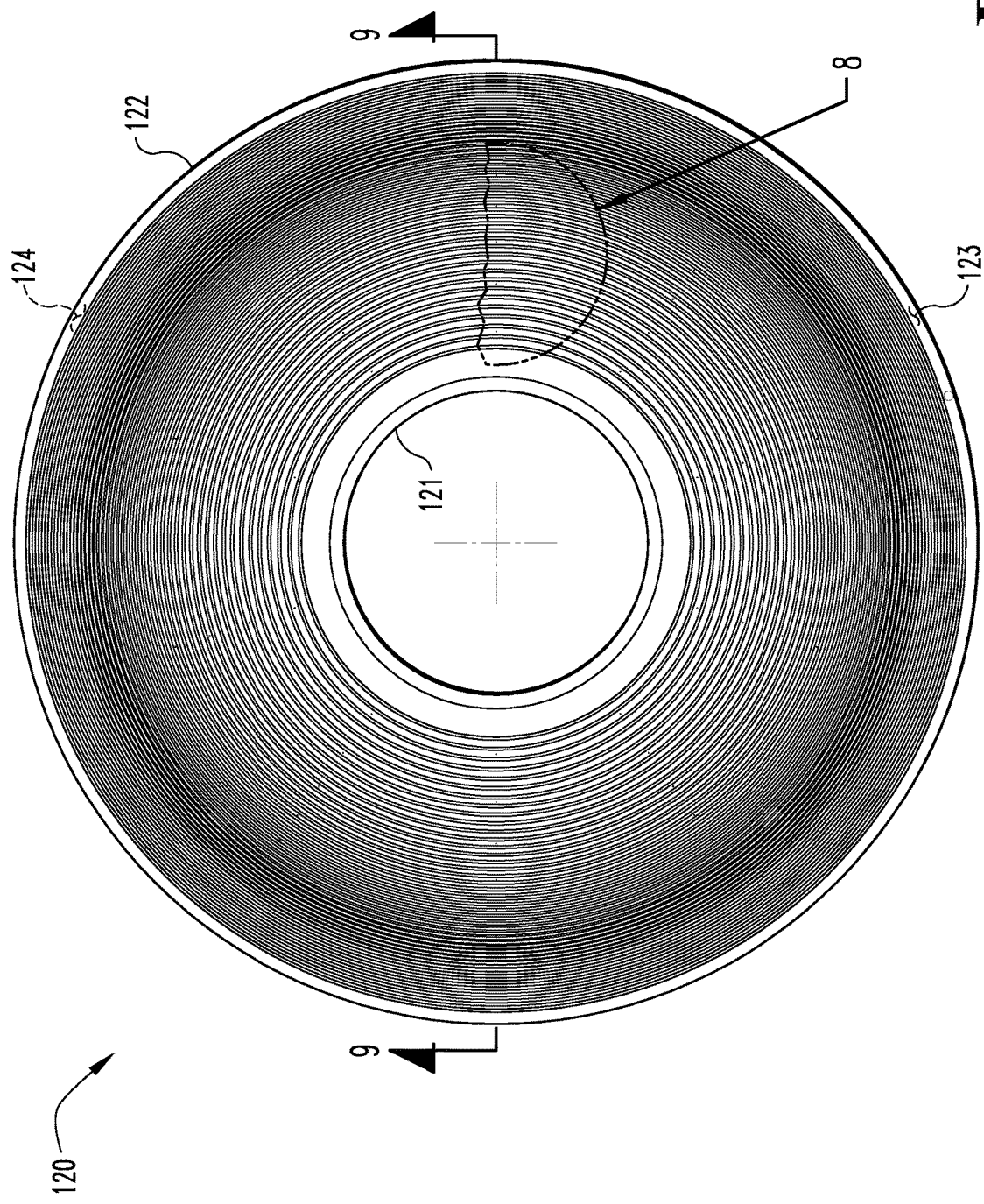
FIG. 7 is a plan view of the upper side of a light guide according to one embodiment of the present disclosure.
Figure 8:
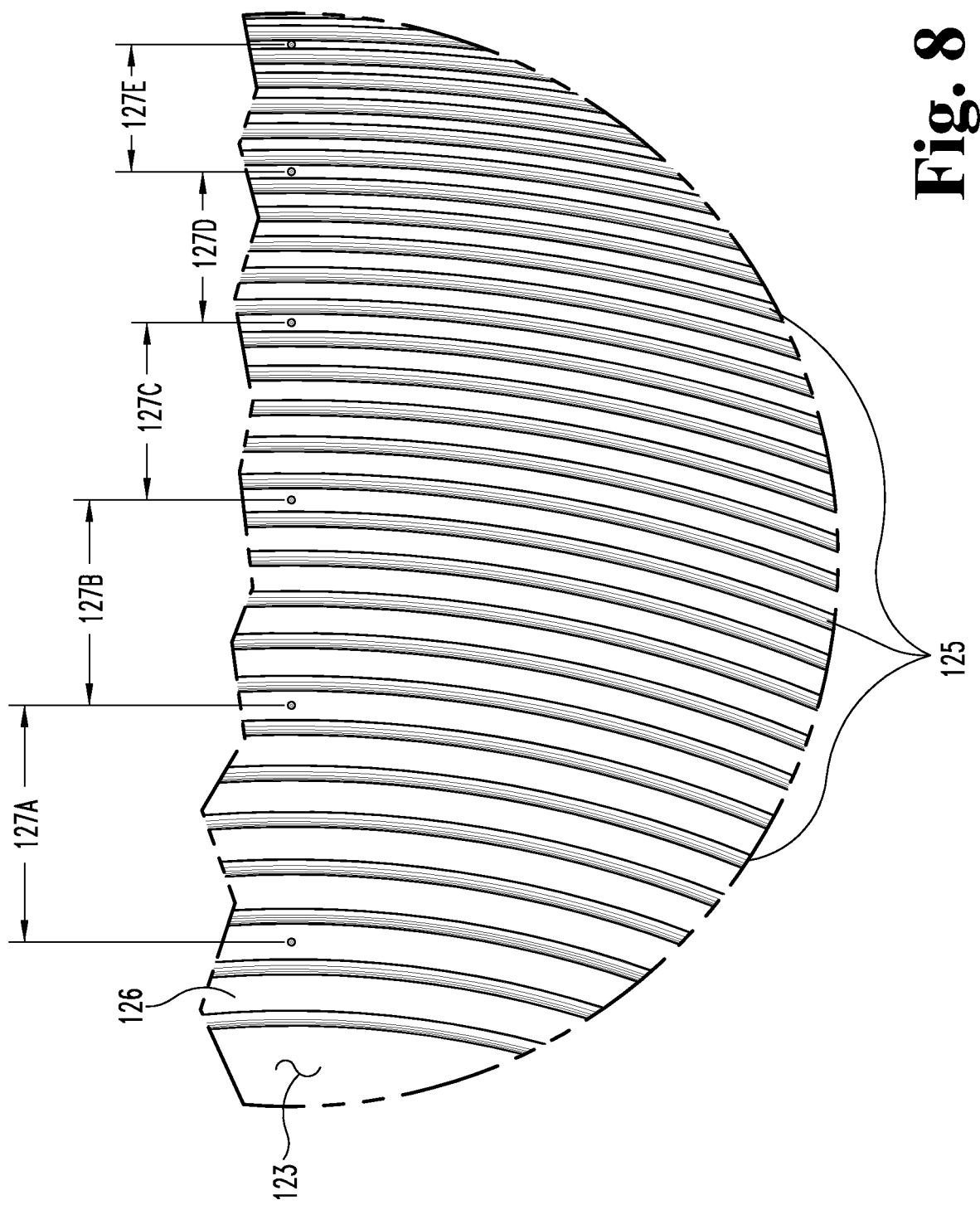
FIG. 8 is a fragmentary view of the light guide shown in FIG. 7.
Figure 9:
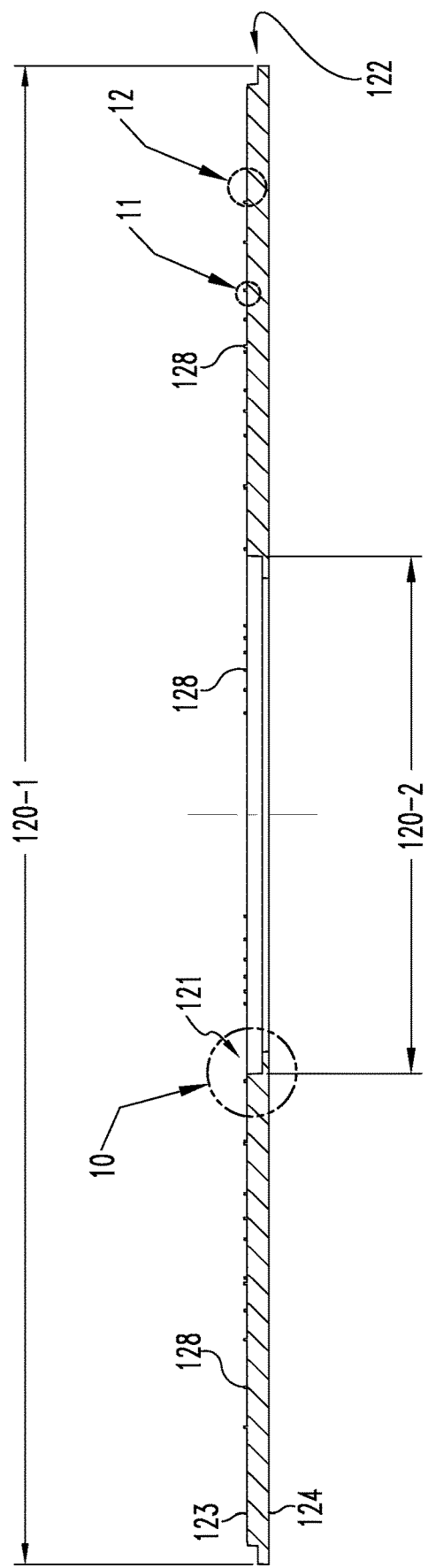
FIG. 9 is a sectional view of the light guide shown in FIG. 7 taken along line 9-9.
Figure 11:
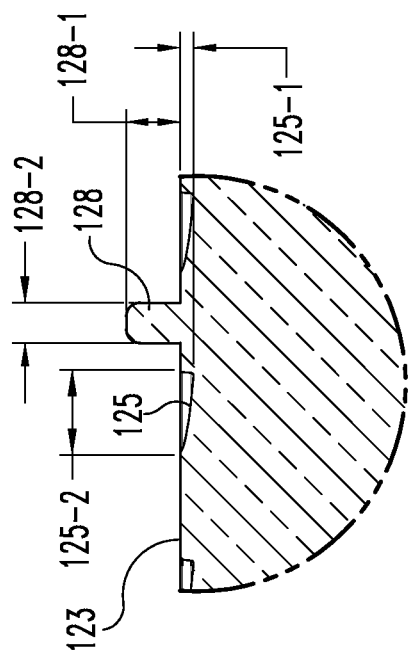
FIG. 11 is a partial, sectional view of detail 11 in FIG. 9.

A light guide 120, according to one embodiment of the present disclosure, is depicted in FIGS. 7-12. In this example, light guide 120 is generally planar with an inner surface 121, an outer surface 122, an upper surface 123 and a lower surface 124. Upper surface 123 will frequently include a plurality of grooves 125 that redirect the light traveling through the light guide 120 (from the inner surface 121 to the outer surface 122 in the illustrated embodiment) in the desired direction. The desired direction in the orientation depicted in FIG. 9 is downward, which is a direction toward the surface desired to be illuminated and is generally represented by light pathways 180 pointing downward in FIG. 5. Referring specifically to FIGS. 11-13, each groove has an overall ramp-like shape that results in the internal reflection of the light 129 traveling from the light emitter 110 through light guide 120, the direction being depicted by the arrow representing light 129 in FIG. 12.

The shape of groove 125 is chosen so that the light 129 propagating through light guide 120 reflects off the primary reflecting surface 125-5 and in the desired direction. The shape of groove 125 may be chosen to achieve total internal reflection of the light. The example grooves 125 depicted in FIGS. 8-13 are generally circular, with similarities to the grooves in a vinyl audio record, when viewed from directly above the light guide 120. However, grooves 125 can have a complex cross-sectional shape as depicted in FIGS. 11-13, presenting a reflecting surface 125-5 that has an overall shape similar to the surface of a truncated cone, which is sometime referred to as being frusto-conical.

Turing to FIG. 13, the primary reflecting surface 125-5 is slightly curved with a large radius as compared to its width. In the illustrated embodiment, the reflecting surface 125-5 has a freeform curvature that, if approximated by a standard geometric shape, is generally parabolic. However, the radius of curvature of reflecting surface 125-5 depicted in FIG. 13 changes over the width 125-2 of the reflecting surface 125-5. The radius of curvature of the portion of reflecting surface 125-5 near the bottom of groove 125 (the right side of groove 125 as depicted in FIG. 13) is approximately four (4) to six (6) times the width 125-2 of groove 125, and the radius of curvature of the portion of reflecting surface 125-5 near the top of groove 125 (the left side of groove 125 as depicted in FIG. 13) is approximately two (2) to four (4) times the width 125-2 of groove 125. The average radius of curvature of the primary reflecting surface 125-5 depicted in FIG. 13 is approximately four (4) times the width 125-2 of groove 120, which is used in some alternative embodiments. In at least one embodiment, the reflecting surface 125-5 for a groove with a width 125-2 of approximately 0.063 inches has a curvature that approximates a circle with a ¼ inch radius.

In other embodiments the shape of reflecting surface 125-5 can be mildly curved with a radius of curvature on the order of ten times the width 125-2 of groove 125, and in still other embodiment the shape of reflecting surface 125-5 can be linear.

The angle 125-9 between the overall slope of the reflecting surface 125-5 and the horizontal plane defined by upper surface 123 is approximately eight (8) degrees to create total internal reflection of the light 129 across a substantial portion of width 125-5. Some embodiments have a reflecting surface 125-5 with a geometric shape (for example, parabolic, elliptical, hyperbolic, or linear) that is inclined approximately 8 degrees across the width of groove 125. In the embodiment depicted in FIG. 13, the slope of the reflecting surface 125-5 is approximately five (5) degrees near the bottom of the groove 125, and approximately 16 degrees near the top of the groove 125.

Figure 5:
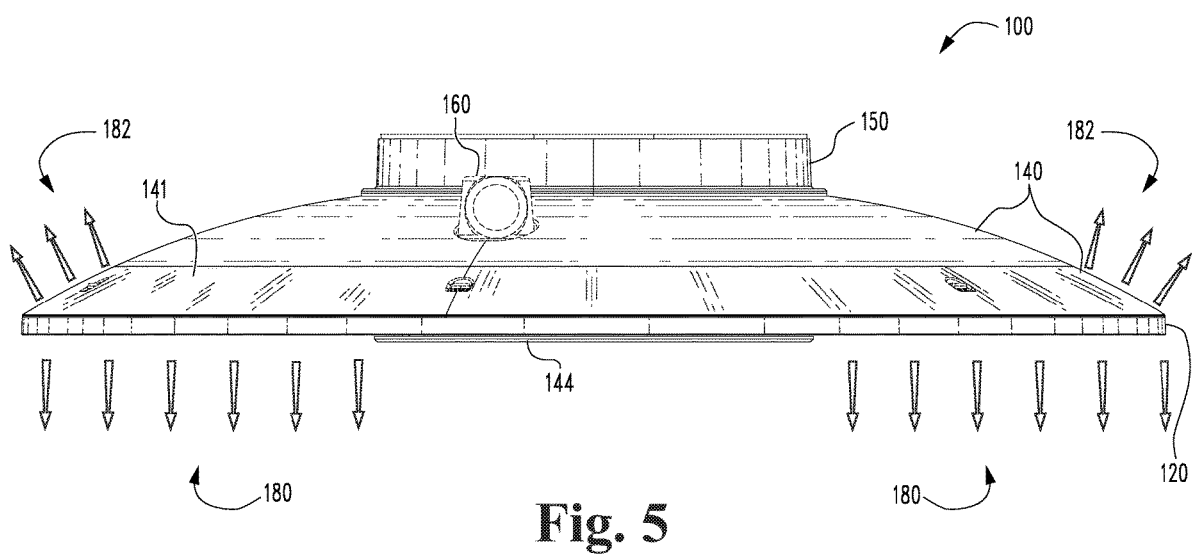
FIG. 5 is a left side elevational view of the embodiment shown in FIG. 1. The right side, front, and rear elevational views are the same with the orientation of the accessory adapter and the seam line on the top of the luminaire changing locations on the drawing due to the different views.

After reflecting off of the reflecting surface 125-5, the light will be generally parallel (collimated) when the reflecting surface is planar from the perspective depicted in FIGS. 11-13, and the light 129 reflected off the reflecting surface 125-5 will be increasingly more fanned out (non-collimated) as the radius of the reflecting surface 125-5 decreases. As such, the example light rays 180 depicted in FIG. 5 are generally parallel and would result for reflecting surfaces 125-5 that are planar from the perspective depicted in FIGS. 11-13, creating light that is concentrated directly under luminaire 100. In embodiments where the reflecting surfaces 125-5 have a radius of curvature from the perspective depicted in FIGS. 11-13, the light rays 180 will increasingly spread out as the radius of curvature of the reflecting surfaces 125-5 decreases, creating a more diffuse light below the luminaire 100, which can be advantageous when fewer luminaires 100 are desired, for example.

Groove 125 also defines a groove depth 125-1, a groove width 125-2, a primary reflecting surface 125-5, and a relief surface 125-7. Primary reflecting surface 125-5 is the primary surface used to redirect the light 129 traveling along the light guide (in the direction depicted by the arrow in FIG. 12) by internally reflecting the light rays off of surface 125-5. In the illustrated embodiment, the groove depth 125-1 is 0.01 inches and the groove width 125-2 is 0.06 inches.

Groove 125 may also include a recurve portion defining a recurve radius 125-3 at the shallow end of the groove to allow some light to propagate in a direction different from the direction dictated by primary reflecting surface 125-5. For example, recurve 125-3 can be shaped so that the light exits the upper surface 123 of light guide 120 instead of being internally reflected. Moreover, the use of a recurve surface 125-3 or the use of a rounded corner such as 125-6 or 125-8, can also decrease the occurrences of stress risers in the light guide material forming groove 125, which could result in the formation of fissures/cracks that could adversely impact the directions in which the light is directed.

The grooves 125 have a limited width 125-2, resulting in a relief surface 125-7. Radius 125-6 between the primary reflecting surface 125-5 and the relief surface 125-7 assists in minimizing stress risers that could otherwise build up in this region (or any region where two surfaces meet an angle) and the possibility that fissures/cracks will form between primary reflecting surface 125-5 and relief surface 125-7. A rounded surface between relief surface 125-7 and upper surface 123 may also increase the durability of light guide 120. Nevertheless, there are optical advantages to having the various radii as small as possible, for example, to minimize the size of the transitional surfaces where the specific shape and inclination are not exactly as desired to achieve the optical effect. In one embodiment of the present disclosure, the radii are listed in Table 1.

TABLE 1

| Element No. | FIG. 13 with a width 125-5 of 0.063 inches (inches) | Preferred Range | |
| --- | --- | --- | --- |
| | | Maximum (inches) | Minimum (inches) |
| 125-3 | 0.005 | 0.010 | 0.002 |
| 125-4 | 0.01 | 0.012 | 0.008 |
| 125-6 | 0.002 | 0.003 | 0.001 |
| 125-8 | 0.002 | 0.003 | 0.01 |

While some embodiments of light guide 120 have a reflecting surface 125-5 that is parabolic, other embodiments have a reflecting surface 125-5 that resembles other geometric shapes, such as hyperbolas, ellipses, circles, and straight lines.

However, due to various reasons that may be out of the control of the designer, such as manufacturing imperfections, some of the light may not be directed in the desired direction.

With reference to FIG. 8, grooves 125 are separated from one another by spacing/gap distance 126. In the embodiment represented by FIGS. 7 and 8, the spacing distance 126 between two adjacent grooves 125 decreases for the grooves positioned farther away from inner surface 121. In other words, the spacing distance 126 between a first pair of adjacent grooves 125 is greater than the spacing distance 126 between a second pair of grooves where the second pair of grooves is located closer to the outer surface 122 than the first pair of grooves. In FIGS. 7 and 8, the spacing/gaps between adjacent grooves decreases exponentially as the grooves are positioned farther form the light emitter 110.

In other embodiments, grooves 125 are spaced according to Table 2, with the gap between the pair of grooves closest to the inner surface 121 (inner-most portion of light guide 120) having a relative nearness to the inner surface 121 of 1, and the next gap moving outwardly from the center having a relative nearness to the inner surface 121 of 2. In these other embodiments, the gap between surface 121-3 and the first groove is 0.59125 inches.

TABLE 2

| Gap's relative nearness to inner surface 121 | Gap between adjacent grooves (inches) | Relative nearness of gap to inner surface 121 | Gap between adjacent grooves (inches) |
|---|---|---|---|
| 1 | 0.14756 | 25 | 0.04265 |
| 2 | 0.14459 | 26 | 0.03475 |
| 3 | 0.13865 | 27 | 0.03170 |
| 4 | 0.13271 | 28 | 0.02880 |
| 5 | 0.12677 | 29 | 0.02280 |
| 6 | 0.12380 | 30 | 0.02285 |
| 7 | 0.11785 | 31 | 0.01885 |
| 8 | 0.11190 | 32 | 0.01395 |
| 9 | 0.10895 | 33 | 0.01095 |
| 10 | 0.10305 | 34 | 0.00800 |
| 11 | 0.09710 | 35 | 0.00700 |
| 12 | 0.09410 | 36 | 0.00470 |
| 13 | 0.08815 | 37 | 0.00475 |
| 14 | 0.08720 | 38 | 0.00475 |
| 15 | 0.07925 | 39 | 0.00475 |
| 16 | 0.07630 | 40 | 0.00475 |
| 17 | 0.07035 | 41 | 0.00475 |
| 18 | 0.06740 | 42 | 0.00475 |
| 19 | 0.06440 | 43 | 0.00475 |
| 20 | 0.05845 | 44 | 0.00470 |
| 21 | 0.05255 | 45 | 0.00470 |
| 22 | 0.05250 | 46 | 0.00470 |
| 23 | 0.04660 | 47 | 0.00470 |
| 24 | 0.04065 | 48 | 0.00470 |

In other embodiments, the grooves are arranged in groups 127 with the spacing 126 between adjacent grooves 125 in the same group being consistent. With reference to FIG. 8, the spacing distance 126 between adjacent grooves 125 included in group 127A is greater than the spacing distance 126 between adjacent grooves 125 in group 127B, which is greater than the spacing distance 126 between adjacent grooves 125 in group 127C, which is greater than the spacing distance 126 between adjacent grooves 125 in group 127D, which is greater than the spacing distance 126 between adjacent grooves 125 in group 127E. In one example embodiment, the spacing distance 126 between adjacent grooves 125 is 0.97 inches in group 127A, 0.84 inches in group 127B, 0.73 inches in group 127C, 0.62 inches in group 127D, and 0.52 inches in group 127E. In some embodiments, the overall diameter 121-1 of light guide 120 is 19.5 inches, and the diameter 121-2 of the aperture in the center of light guide 120 is 6.2 inches. Arranging the grooves 125 into groupings 127 can decrease the manufacturing complexity and cost while still producing a sufficiently uniform, although not exactly uniform, luminance.

Decreasing the spacing distance 126 between adjacent grooves 125 for grooves farther from the light emitter 110, results in the light being directed downward by internal reflection off of grooves 125 having relatively uniform luminance (candela per square inch) over the lower surface 124 of light guide 120 while the thickness of the light guide remains constant.

Figure 10:
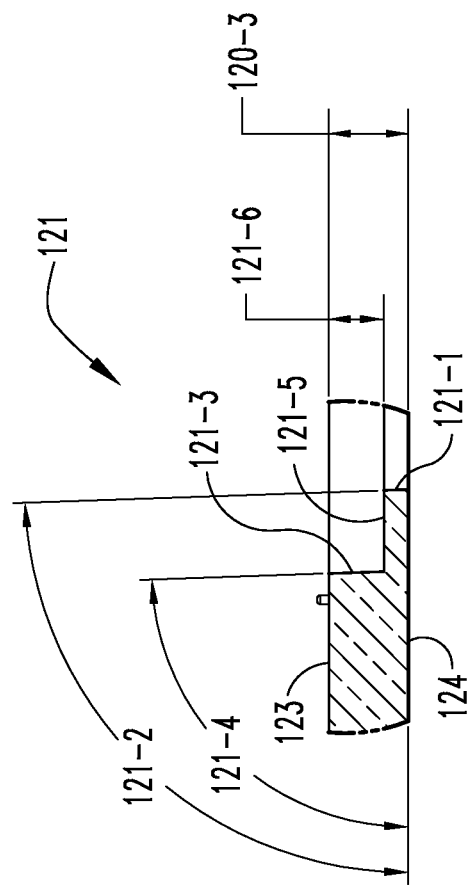
FIG. 10 is a partial, sectional view of detail 10 in FIG. 9.

Depicted in FIG. 10 is a close-up view of the inner surface 121 of light guide 120. Inner surface 121 includes a lower portion 121-1 and an upper portion 121-3, which are radially displaced from one another forming a shelf 121-5. While in some embodiments lower portion 121-1 of inner surface 121 and upper portion 121-3 of inner surface 121 are perpendicular to upper surface 123 and lower surface 124, in other embodiments lower portion 121-1 of inner surface 121 and upper portion 121-3 of inner surface 121 are inclined. For example, in the embodiment depicted in FIG. 10, lower portion 121-1 is inclined at an angle 121-2 in relation to the lower surface 124 and upper portion 121-3 of inner surface 121 is inclined at an angle 121-4 in relation to lower surface 124. In one example, lower portion angle 121-2 is 88 degrees and upper portion angle 121-4 is approximately 88 degrees. In example embodiments, the height 121-6 of upper portion 121-3 is 0.20 inches and the overall thickness 120-3 of light guide 120 is 0.28 inches.

Depicted in FIGS. 9 and 11 are optional posts 128. Posts 128 are positioned in the spacing 126 between grooves 125 and extend above upper surface 123 to support reflector 146. Although other structures, such as ridges, may be used to separate reflector 146 from light guide 120, posts 128 are capable of separating reflector 146 from the upper surface 123 of light guide 120 while minimizing the optical interference the posts will have on the operation of light guide 120 and grooves 125. In the example embodiment depicted in FIG. 11, the height 128-1 of post 128 above upper surface 123 is 0.04 inches, and the width 128-2 of post 128 is 0.03 inches.

In some embodiments, such as the illustrated embodiment, reflector 146 is coextensive with (in other words, covers) approximately 80% of the upper surface 132 of light guide 120, leaving approximately 20% of the light guide uncovered. In other embodiments, approximately 90% of the upper surface 132 of light guide 120, leaving approximately 10% of the light guide uncovered. The end result is that approximately 5 to 30 percent of the total luminous intensity (measured in, for example, candelas) of the light exiting the light guide 120 of luminaire 100 is directed toward the mounting surface. In other embodiments approximately 10 to 15 percent of the total luminous intensity of luminaire 100 is directed toward the mounting surface. In still further embodiments, reflector 146 covers the entire upper surface 132 of light guide 120, resulting in no more than 5% of the total luminous intensity of luminaire being directed toward the mounting surface, which.

Figure 14:
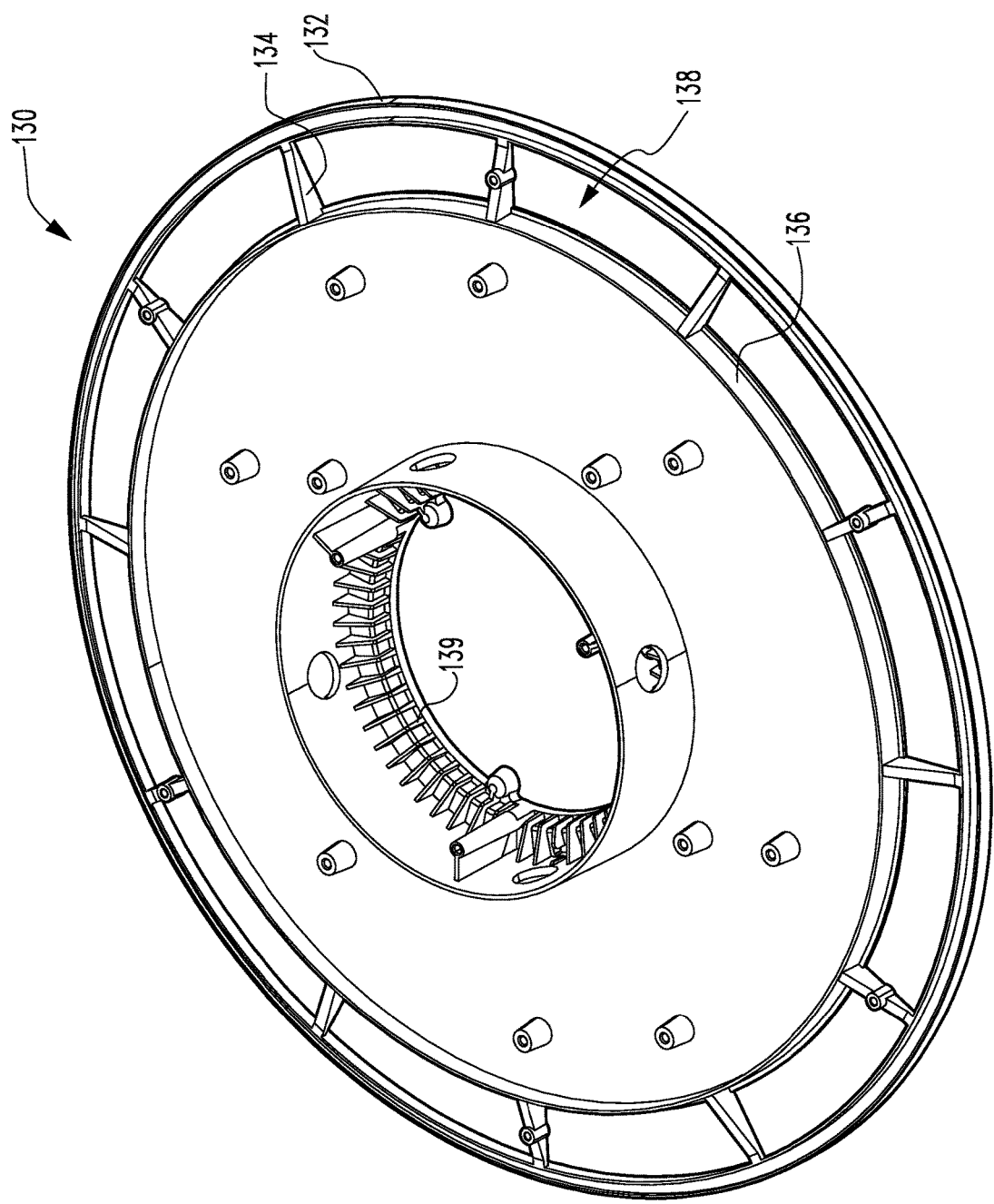
FIG. 14 is a perspective view of the upper side of a housing according to one embodiment of the present disclosure.
Figure 15:
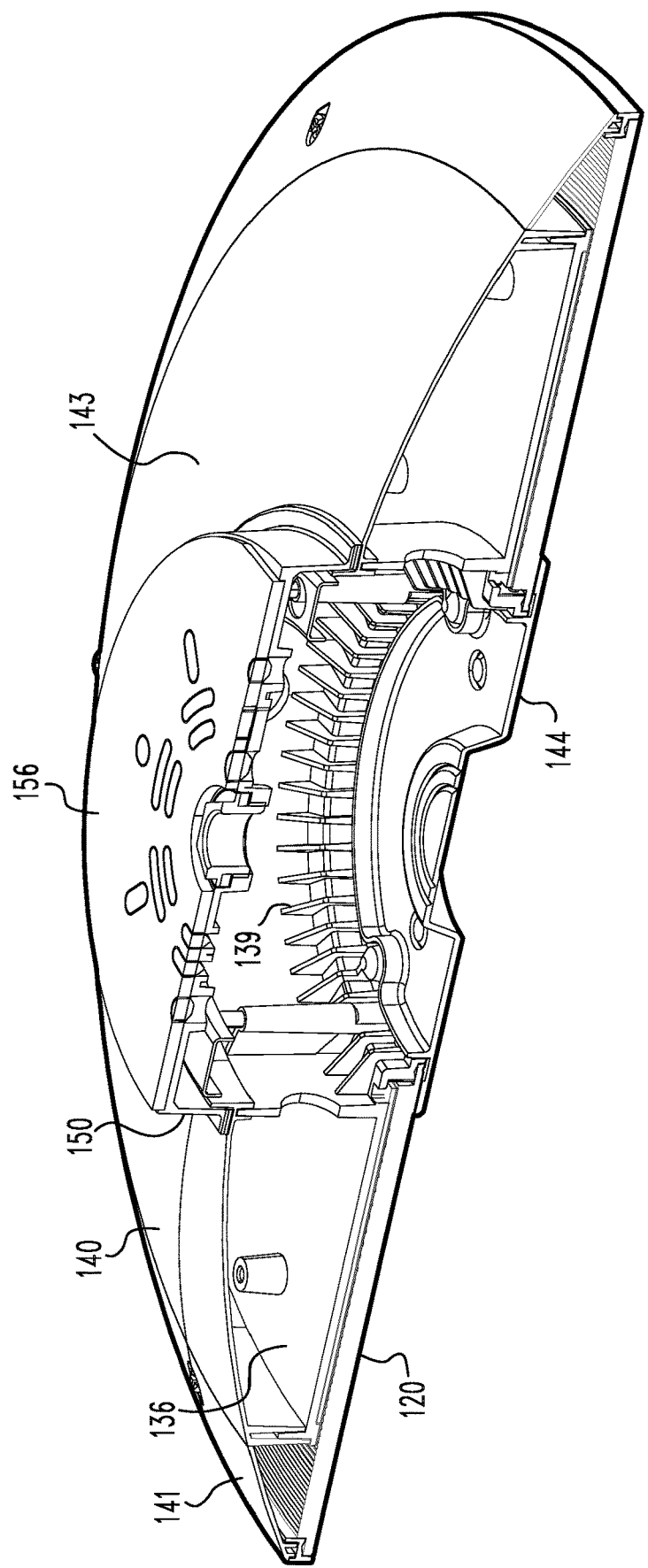
FIG. 15 is a sectional view of the luminaire shown in FIG. 1 taken along line 15-15.

Depicted in FIG. 14 is a housing 130 according to one example embodiment of the present disclosure. Housing 130 includes an opaque portion 136 and a transparent portion 138. An optional ring 132 may be connected to the opaque portion 136, such as with spokes 134. In the illustrated embodiment, transparent portion 138 includes a plurality of openings bordered by inner portion 136, outer ring 132, and spokes 134. Using openings instead of a transparent member (for example, glass or transparent plastic) in transparent portion 138 has advantages in that material and manufacturing costs are decreased and the overall weight of the luminaire 100 is also decreased. Nevertheless, alternate embodiments may include one or more transparent or translucent members positioned between inner portion 136, outer ring 132 and spokes 134, which may be used to scatter the light escaping from the top of luminaire 100.

The diameter of housing 130 is approximately equal to the diameter of the light guide 120. In at least one embodiment, the overall diameter of inner portion 136 is approximately equal to the overall diameter of reflector 146. Inner portion 136 may also provide a mounting surface for components enclosed within housing 130. In the illustrated embodiment, reflector 146 mounts on the underside of inner portion 136. In some embodiments, such as those requiring little up light, housing 130 does not include a transparent portion 138.

Housing 130 may include cooling fins 139 that assist in dissipating heat to maintain a more constant operating temperature for light emitter 110. In embodiments where light emitter 110 includes LED light sources 112, the thermal regulation provided by cooling fins 139 assists in maintaining the operating temperatures of LED light sources 112 within acceptable ranges, thereby increasing the performance and extending the longevity of the LED light emitters.

With reference to FIGS. 1, 3, 5 and 15, cover 140 includes an outer portion 141 and an inner portion 143. The outer diameter of cover 140's inner portion 143 is approximately equal to the outer diameter of housing 130's opaque portion 136. As such, when luminaire 100 is assembled, inner portion 143 (which may be opaque) of cover 140 overlies opaque portion 136 of housing 130. Opaque portion 136 of housing 130 and reflector 146 prevent light from light emitter 110 from reaching inner portion 143 of cover 140. As such, embodiments of luminaire 100 include an inner portion 143 of cover 140 that may be transparent or opaque.

Outer portion 141 of cover 140 overlies transparent portion 138 of housing 130, and is transparent in at least one embodiment. In embodiments where outer portion 141 is transparent, light from light emitter 110 is directed upward, passes through transparent portion 138 of housing 130, through outer portion 141 of cover 140, along light pathways 182 (see FIG. 5), and impinges upon the mounting surface for luminaire 100, thereby illuminating the mounting surface.

Figure 2:
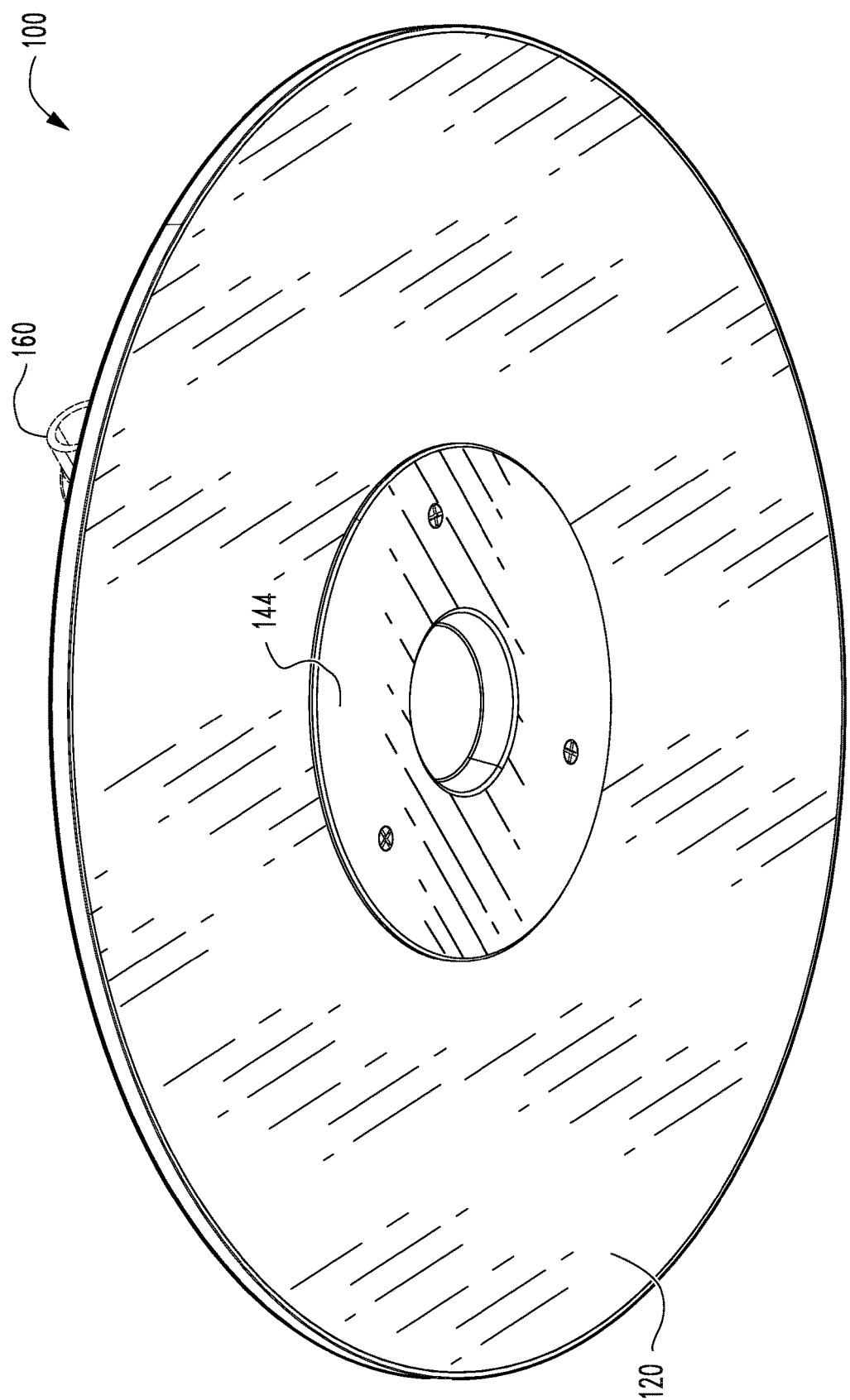
FIG. 2 is a perspective view of the lower side of the embodiment shown in FIG. 1.
Figure 3:
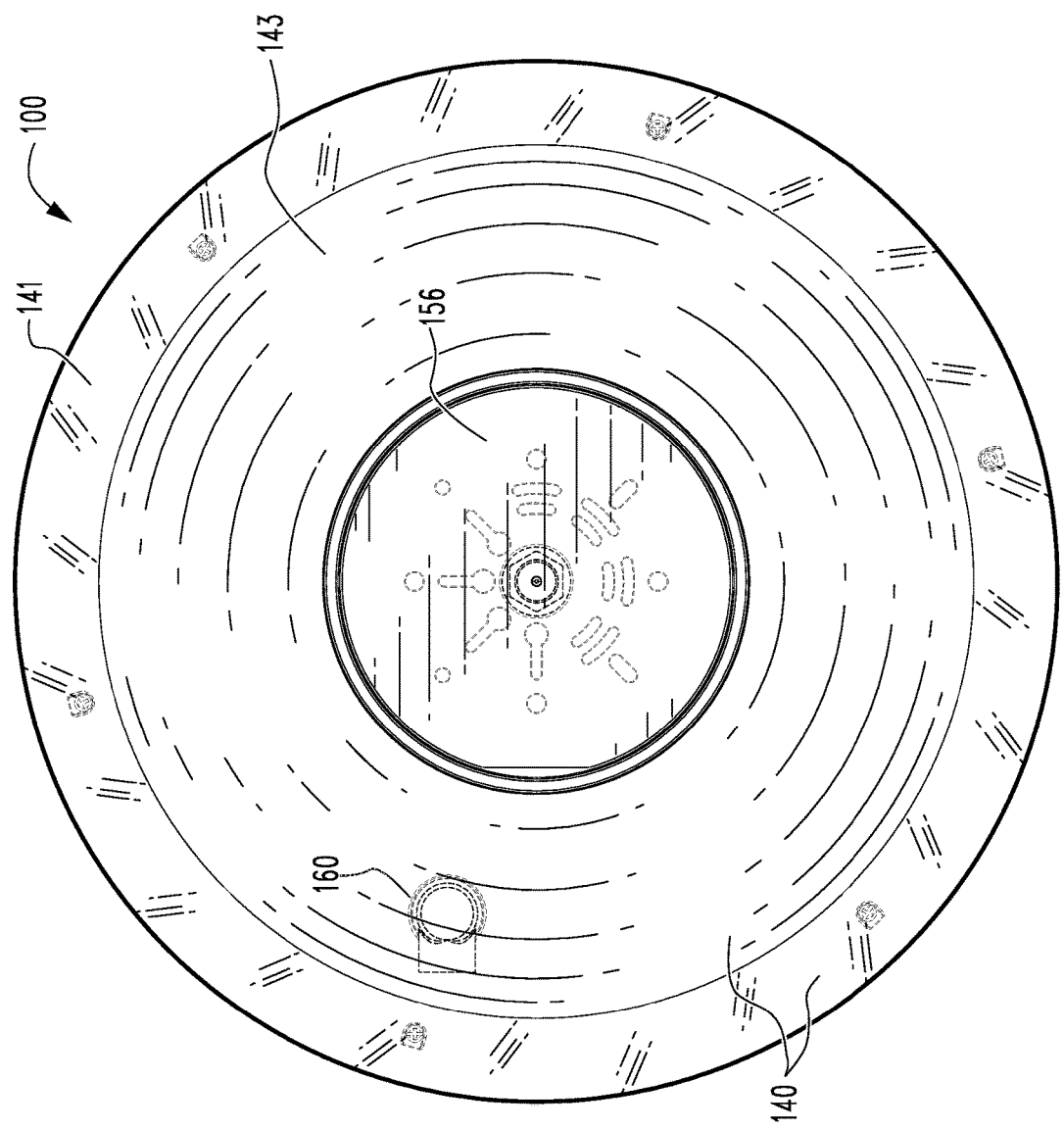
FIG. 3 is a plan view of the upper side of the embodiment shown in FIG. 1.
Figure 4:
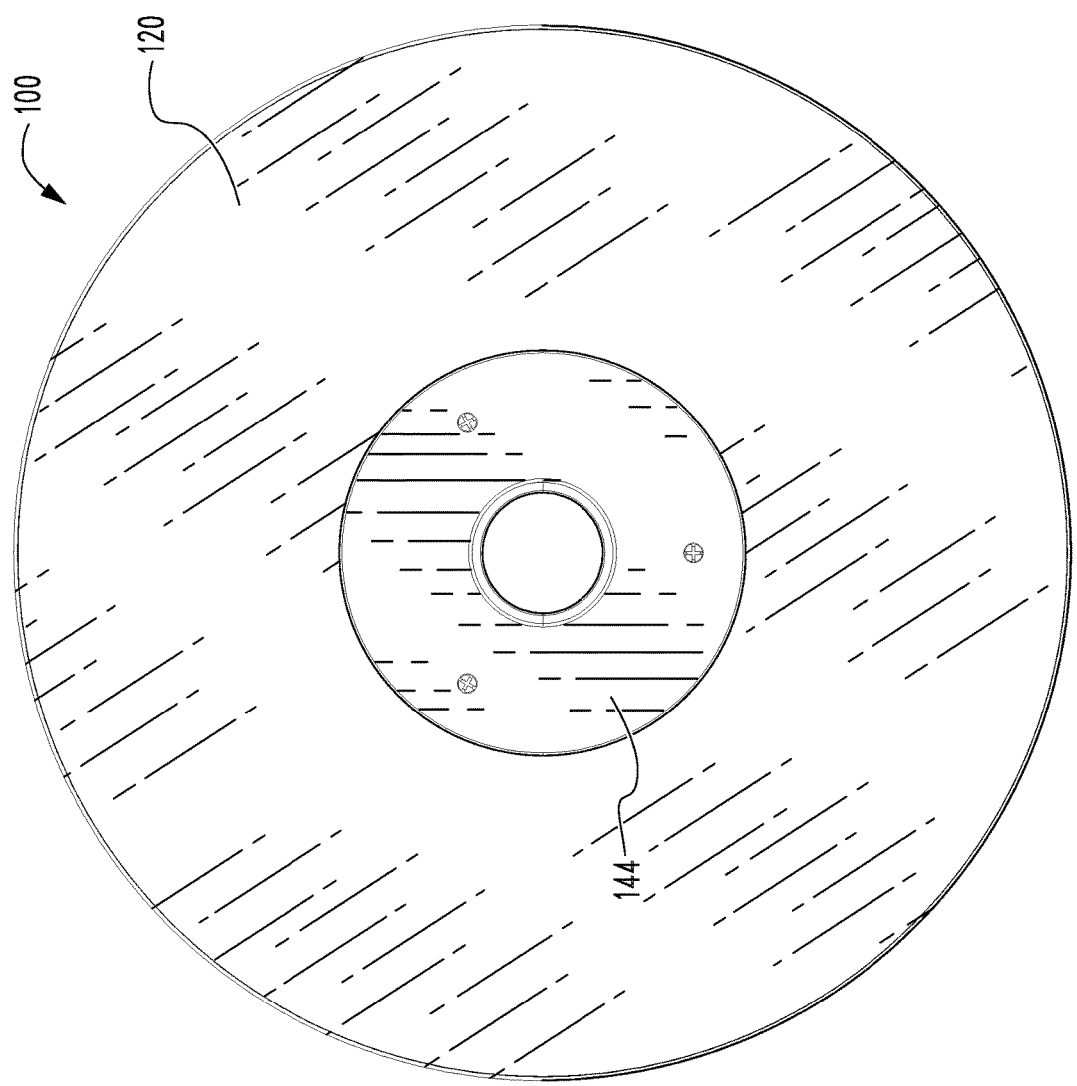
FIG. 4 is a plan view of the bottom side of the embodiment shown in FIG. 1.

Turning to FIGS. 2 and 6, luminaire 100 may also include a lower cover 144. In some embodiments, cover 144 inhibits a user from directly viewing the light emitter 110 from below the luminaire 100, such as to present fewer hot/bright spots. As such, in some embodiments, cover 144 is opaque and completely obscures light emitter 110 from being viewed from below luminaire 100, or is translucent and partially obscures light emitter 110. An optional gasket 142 can be used to mount cover 144 to luminaire 100 to provide a water tight seal that is useful when luminaire 100 is operated in a damp environment.

Referring to FIGS. 1 and 6, a mounting box 150 may be utilized for mounting luminaire 100 to a mounting surface. Gaskets 152, 156 and 157, bracket 154, and mounting nut 159 may be used to connect mounting box 150 to luminaire 100. Gaskets 152, 156 and 157 are helpful to keep moisture out of luminaire 100 when operating luminaire 100 in a damp environment.

As depicted in FIGS. 1 and 6, luminaire 100 may include an optional accessory adapter 160. Accessory adapter 160 typically includes electrical connectors so that when an accessory is attached to accessory adapter 160, the accessory will also be operationally connected to the light emitter 110 and drivers 170, to provide the ability to add various features or controls to luminaire 100 without requiring replacement of luminaire 100. For example, motion sensors, ambient light sensors, or controllers that allow or provide remote operation of luminaire 100 can be attached to accessory adapter 160. As shown in FIG. 6, accessory adapter 160 may include a gasket 162 to inhibit moisture intrusion into luminaire 100, a lock nut 164 for securing accessory adapter 160 to luminaire 100, and a cap 166 that may be utilized to occlude the opening in accessory adapter 160 to which an accessory can be connected.

Referring to FIG. 6, driver mounting brackets 172 may optionally be utilized to securely mount the one or more drivers 170 within luminaire 100.

When assembled, luminaire 100 is configured and adapted to mount to a surface positioned at an expected distance and location with respect to the luminaire 100. When mounted to a ceiling at a predetermined distance from the luminaire 100, illumination of the light source 110 results in the simultaneous illumination of the ceiling and the floor using the same light source. While one light source may be used to illuminate the floor and another light source used to illuminate the ceiling, the need for additional wiring, increased complexity, increased cost and increased energy consumption due to having two light emitters results in this alternative being generally less favored over dividing the light emanating from a single light source and directing the light toward and away from the expected mounting surface.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element (for example, mounting structure), or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

Element Numbering

Table 3 includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

TABLE 3

| | |
|---|---|
| 100 | Luminaire |
| 110 | Light Emitting Member |

TABLE 3-continued

| | |
|---|---|
| 112 | Light Source (e.g., LED) |
| 114 | Light Base |
| 120 | Light Guide |
| 120-1 | Outer Diameter |
| 120-2 | Aperture Diameter |
| 120-3 | Light Guide Thickness |
| 121 | Inner Surface |
| 121-1 | Lower Portion |
| 121-2 | Lower Portion Angle |
| 121-3 | Upper Portion |
| 121-4 | Upper Portion Angle |
| 121-5 | Shelf |
| 121-6 | Upper Portion Height |
| 122 | Outer Surface |
| 123 | Upper Surface |
| 124 | Lower Surface |
| 125 | Groove |
| 125-1 | Groove Depth |
| 125-2 | Groove Width |
| 125-3 | Groove Recurve |
| 125-4 | Radius |
| 125-5 | Primary Reflecting Surface |
| 125-6 | Radius |
| 125-7 | Relief Surface |
| 125-8 | Radius |
| 125-9 | Angle |
| 126 | Spacing Distance |
| 127 | Group |
| 128 | Post |
| 128-1 | Post Height |
| 128-2 | Post Width |
| 129 | Light |
| 130 | Housing |
| 132 | Outer Ring |
| 134 | Spoke |
| 136 | Inner (Opaque) Portion |
| 138 | Transparent Portion (opening) |
| 139 | Fins |
| 140 | Cover (2 types) |
| 141 | Outer Portion |
| 142 | Gasket |
| 143 | Inner Portion |
| 144 | Cover |
| 146 | Reflector (2 types) |
| 150 | Mounting Box |
| 152 | Gasket |
| 154 | Bracket |
| 156 | Gasket |
| 157 | Gasket |
| 159 | Mounting Nut |
| 160 | Accessory Adapter |
| 162 | Gasket |
| 164 | Locknut |
| 166 | Cap |
| 170 | Driver |
| 172 | Driver Mounting Bracket |
| 180 | Light Pathways |
| 182 | Light Pathways |

What is claimed is:

1. A luminaire mountable to a mounting surface, comprising:
a light source adapted to emit light;
a mounting member connected to the light source and adapted to mount to a mounting surface with an expected shape, the mounting member including an inner opaque portion and an outer light passing portion, the inner opaque portion configured to inhibit light from passing from one side of the inner opaque portion to the other and the outer light passing portion configured to pass light from one side of the outer light passing portion to the other; and
a light directing member connected to the mounting member and positioned to receive light from the light source and direct light to the mounting member light passing portion, wherein the light directing member directs light received from the light source toward and away from a mounting surface with the expected shape when the mounting member is mounted to the mounting surface with the expected shape, a portion of the light being directed toward the mounting surface passing through the light passing portion of the mounting member;
a light blocking member connected to the mounting member and positioned to block less than all of the light received from the light source and directed toward an expected mounting surface by the light directing member.

2. The luminaire of claim 1, wherein the light blocking member includes a reflective surface facing the light directing member.

3. The luminaire of claim 2, wherein
the light directing member is a planar light guide with a central aperture and an outer edge,
the light source is positioned in the central aperture,
the light blocking member is positioned to block light emanating from the light guide adjacent to the aperture, and
the light blocking member is positioned to permit light emanating from the light guide adjacent the outer edge to continue along its pathway.

4. The luminaire of claim 1, wherein 20 percent of the total luminance (candela per square inch) of the luminaire is directed toward an expected mounting surface.

5. The luminaire of claim 1, wherein the light directing member includes a plurality of grooves on the surface facing the mounting surface, and wherein greater than half of the light from the light source and propagating through the light directing member internally reflects off the plurality of grooves.

6. The luminaire of claim 5, wherein
the light directing member is a planar light guide with a central aperture and an outer edge,
the light blocking member is positioned to block light emanating from the light guide adjacent to the aperture, and
the grooves form concentric circles.

7. The luminaire of claim 6, wherein the distance between adjacent grooves near the central aperture is greater than the spacing between adjacent grooves near the outer edge.

8. The luminaire of claim 7, wherein the distance between adjacent grooves decreases as the distance from the aperture to the midpoint between the adjacent grooves increases.

9. The luminaire of claim 7, wherein the distances between adjacent grooves are grouped together with the spacing in one group being equal and different from the spacing in the other groups.

10. The luminaire of claim 1, wherein all light directed toward an expected mounting surface is directed toward an expected mounting surface by the light directing member.

11. The luminaire of claim 1, wherein:
the light directing member includes two opposing surfaces, the first opposing surface includes a plurality of parallel grooves, each groove adapted to internally reflect light propagating through the light guide from the light source in a direction toward the second opposing surface, the second opposing surface being arranged to pass the light being reflected from the grooves on the first opposing surface through the second opposing surface and out of the light directing member, and the grooves are arranged in at least two adjacent groups, the grooves in the first adjacent group being spaced from one another by a first distance, and the grooves in the second adjacent group being spaced from one another by a second distance different from the first distance.

12. The luminaire of claim 11, wherein the light directing member includes an aperture and an outer edge, the light source being located in the aperture, and the light directing member defines a thickness that is constant from the aperture to the outer edge.

13. The luminaire of claim 11, wherein the parallel grooves are arranged in concentric circles.

14. The luminaire of claim 13, comprising:
a reflector attached to the light source and positioned adjacent the first opposing surface;
wherein the reflector reflects light escaping from the first opposing surface back toward the first opposing surface, and
wherein the first opposing surface of the light directing member includes posts contacting the reflector and spacing the reflector from the light guide.

15. The luminaire of claim 14, wherein the reflector is sized to be coextensive with at most 90% of the first opposing surface.

16. A luminaire, comprising:
a light emitter; and
means for dividing the light from the light emitter, directing a portion of the light from the light emitter toward a mounting surface to which the luminaire is adapted to mount, and directing a portion of the light from the light emitter away from a mounting surface to which the luminaire is adapted to mount, wherein said means includes;
a cover positioned on a side of the light emitter intended to be between the light emitter and the mounting surface to which the luminaire is adapted to mount, the cover defining a central light blocking portion and an outer light passing portion; and
a planar light guide and the light emitter is mounted adjacent one edge of the planar light guide.

17. The luminaire of claim 16, wherein the portion of the light directed from the light emitter toward a mounting surface to which the luminaire is adapted to mount equals 10 to 15 percent of the total light being directed toward and away from a mounting surface to which the luminaire is adapted to mount.

18. A method, comprising:
selecting an expected shape for a mounting surface;
connecting a light emitter to a mounting structure, the mounting structure adapted to mount to a mounting surface with the expected shape, the mounting structure including a central reflective portion and a peripheral light transmitting portion;
connecting a planar light directing member to the mounting structure;
positioning the light directing member to receive light from the light emitter and simultaneously direct light received from the light emitter toward the central reflective portion, toward the peripheral light transmitting portion and away from a mounting surface with the expected shape.

19. The luminaire of claim 1, wherein the outer light passing portion surrounds the inner opaque portion.

20. The luminaire of claim 1, wherein the light passing portion defines an outer edge and the light directing member defines an outer edge, the outer edge of the directing member extending at least to the outer edge of the light passing portion.

21. The luminaire of claim 20, wherein the light blocking member defines a shape with a central aperture.

22. The luminaire of claim 13, wherein the parallel grooves are separated from one another by a gap distance, and the gap distance is arranged according to the following table:

| Gap's relative nearness to inner surface 121 | Gap between adjacent grooves (inches) | Relative nearness of gap to inner surface 121 | Gap between adjacent grooves (inches) |
| --- | --- | --- | --- |
| 1 | 0.14756 | 25 | 0.04265 |
| 2 | 0.14459 | 26 | 0.03475 |
| 3 | 0.13865 | 27 | 0.03170 |
| 4 | 0.13271 | 28 | 0.02880 |
| 5 | 0.12677 | 29 | 0.02280 |
| 6 | 0.12380 | 30 | 0.02285 |
| 7 | 0.11785 | 31 | 0.01885 |
| 8 | 0.11190 | 32 | 0.01395 |
| 9 | 0.10895 | 33 | 0.01095 |
| 10 | 0.10305 | 34 | 0.00800 |
| 11 | 0.09710 | 35 | 0.00700 |
| 12 | 0.09410 | 36 | 0.00470 |
| 13 | 0.08815 | 37 | 0.00475 |
| 14 | 0.08720 | 38 | 0.00475 |
| 15 | 0.07925 | 39 | 0.00475 |
| 16 | 0.07630 | 40 | 0.00475 |
| 17 | 0.07035 | 41 | 0.00475 |
| 18 | 0.06740 | 42 | 0.00475 |
| 19 | 0.06440 | 43 | 0.00475 |
| 20 | 0.05845 | 44 | 0.00470 |
| 21 | 0.05255 | 45 | 0.00470 |
| 22 | 0.05250 | 46 | 0.00470 |
| 23 | 0.04660 | 47 | 0.00470 |
| 24 | 0.04065 | 48 | 0.00470 |

* * * * *